United States Patent
Thoreson et al.

(10) Patent No.: US 10,512,957 B2
(45) Date of Patent: *Dec. 24, 2019

(54) COLLOIDAL AGENTS FOR AQUIFER AND METALS REMEDIATION

(71) Applicant: REGENESIS BIOREMEDIATION PRODUCTS, San Clemente, CA (US)

(72) Inventors: Kristen A. Thoreson, Irvine, CA (US); Jeremy Birnstingl, Bath (GB); Stephanie R. Rittenhouse, San Clemente, CA (US); Katherine Djernes Pappano, Costa Mesa, CA (US); Melinda T. Pham, Lake Forest, CA (US)

(73) Assignee: REGENESIS BIOREMEDIATION PRODUCTS, San Clemente, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/460,003

(22) Filed: Mar. 15, 2017

(65) Prior Publication Data

US 2017/0182532 A1 Jun. 29, 2017

Related U.S. Application Data

(63) Continuation-in-part of application No. 14/449,404, filed on Aug. 1, 2014, now Pat. No. 9,770,743.

(60) Provisional application No. 62/309,193, filed on Mar. 16, 2016, provisional application No. 61/861,854, filed on Aug. 2, 2013.

(51) Int. Cl.
*B09C 1/00* (2006.01)
*C09K 17/50* (2006.01)
*C02F 1/68* (2006.01)

(52) U.S. Cl.
CPC ............ *B09C 1/002* (2013.01); *C02F 1/683* (2013.01); *C09K 17/50* (2013.01); *B09C 2101/00* (2013.01); *C02F 2305/04* (2013.01)

(58) Field of Classification Search
None
See application file for complete search history.

(56) References Cited

U.S. PATENT DOCUMENTS

| | | |
|---|---|---|
| 2,509,777 A | 5/1950 | McMillan et al. |
| 3,286,475 A | 11/1966 | Adams |
| 3,785,852 A | 1/1974 | Schleidt |
| 4,033,894 A | 7/1977 | McLaughlin et al. |
| 4,168,924 A | 9/1979 | Draper et al. |
| 4,211,822 A | 7/1980 | Kurfman et al. |
| 4,504,528 A | 3/1985 | Zucker et al. |
| 4,664,809 A | 5/1987 | Fenton et al. |
| 5,006,250 A | 4/1991 | Roberts et al. |
| 5,217,616 A | 6/1993 | Sanyal et al. |
| 5,266,213 A | 11/1993 | Gillham |
| 5,395,419 A | 3/1995 | Farone et al. |
| 5,514,279 A | 5/1996 | Blowes et al. |
| 5,580,770 A | 12/1996 | DeFilippi |
| 5,591,118 A | 1/1997 | Bierck |
| 6,200,530 B1 | 3/2001 | Markels, Jr. |
| 6,592,294 B1 | 7/2003 | Moore |
| 6,596,190 B1 | 7/2003 | Igawa et al. |
| 6,806,078 B2 | 10/2004 | Newman |
| 7,101,115 B2 | 9/2006 | Luthy et al. |
| 7,160,471 B2 | 1/2007 | Looney et al. |
| 7,337,711 B2 | 3/2008 | Holcomb et al. |
| 7,395,863 B2 | 7/2008 | Wang et al. |
| 7,585,132 B2 | 9/2009 | Imbrie |
| 7,845,883 B1 | 12/2010 | Siler, III et al. |
| 7,963,720 B2 | 6/2011 | Hoag et al. |
| 7,985,460 B2 | 7/2011 | Polk |
| 8,097,559 B2 * | 1/2012 | Noland ............... B01J 20/02 502/406 |
| 8,748,331 B2 | 6/2014 | Talley et al. |
| 8,986,545 B2 | 3/2015 | Kolhatkar |
| 9,770,743 B2 * | 9/2017 | Mork ............... B09C 1/08 |
| 2003/0047507 A1 | 3/2003 | Hou et al. |
| 2004/0031223 A1 | 2/2004 | Durning et al. |
| 2004/0195182 A1 | 10/2004 | Elliott |

(Continued)

FOREIGN PATENT DOCUMENTS

| | | |
|---|---|---|
| JP | 2006075799 | 3/2006 |
| WO | 9849106 | 11/1998 |
| WO | WO2015123569 | 8/2015 |

OTHER PUBLICATIONS

Bezbaruah, J. Haz. Mat., 166:1339-1344 (Year: 2009).*

(Continued)

*Primary Examiner* — Chester T Barry
(74) *Attorney, Agent, or Firm* — Stetina Brunda Garred and Brucker

(57) ABSTRACT

Compositions and methods for treating contaminated soil and/or ground water in situ. The compositions and methods comprise stabilized forms of colloidal remediation agents that are used to remediate contaminants, namely, organic and inorganic contaminants. The compositions and methods of the present invention are operative to transport particulate remediation agent materials through a matrix of soil and groundwater upon application by injection, gravity feed, or percolation into soil and groundwater, which in turn sequester, destroy or stabilize contaminants out of water to thus decontaminate groundwater in place without the cost or disruption associated with digging the contaminated soil and groundwater out of the ground for on-site purification or disposal at a hazardous waste landfill.

17 Claims, No Drawings

(56) References Cited

U.S. PATENT DOCUMENTS

| | | |
|---|---|---|
| 2004/0249025 A1 | 12/2004 | Dean |
| 2005/0263460 A1 | 12/2005 | Farone et al. |
| 2005/0282390 A1 | 12/2005 | Bian et al. |
| 2006/0054570 A1 | 3/2006 | Block et al. |
| 2006/0088498 A1 | 4/2006 | Martin et al. |
| 2006/0154815 A1 | 7/2006 | Abe et al. |
| 2006/0196850 A1 | 9/2006 | Roh et al. |
| 2007/0297858 A1 | 12/2007 | Imbrie |
| 2008/0008535 A1 | 1/2008 | Ball |
| 2008/0125334 A1 | 5/2008 | Burns et al. |
| 2008/0176943 A1 | 7/2008 | Kaiser et al. |
| 2009/0197042 A1 | 8/2009 | Polk |
| 2010/0234233 A1 | 9/2010 | Sannino et al. |
| 2011/0260098 A1 | 10/2011 | Ma et al. |
| 2013/0058724 A1 | 3/2013 | John et al. |
| 2015/0034559 A1 | 2/2015 | Mork et al. |
| 2016/0031766 A1* | 2/2016 | Bezbaruah ............ C05B 17/00 71/23 |

OTHER PUBLICATIONS

Mackenzie et al, "Carbo-Iron an Fe/AC composite as alternative to nano-iron for groundwater treatment", Water Res.; Aug. 2012, vol. 46 (12); pp. 3817-3826; (retrieved from Internet: (http:www///.sciencedirect.com/science/article/pii/S0043135412002552#), pp. 38'9, col. 2. para 2; p. 3820, col. 1, para 4; p. 3822, col. 2, para 2-3; abstract.

Committee on Future Options for Management in the Nation's Subsurface Remediation Effort et al.; Prepublication Alternatives for Managing the Nation's Complex Contaminated Groundwater Sites; 2012; 339 pages; National Academy of Sciences; The National Academies Press; Washington, D.C.; US.

Young, Lee W.; International Search Report; PCT/US 15/15899; dated Jan. 15, 2015; 8 pages.

Young, Lee W.; International Search Report; PCT/US 14/494,468; dated Aug. 2, 2013; 9 pages.

Copenheaver, Blaine R.; International Search Report; PCT/US2011/058388; dated Feb. 17, 2012; 6 pages.

Young, Lee W.; International Search Report; PCT/US 18/32145 ; dated Aug. 1, 2018; 10 pages.

Young, Lee W.; International Search Report; PCT/US 18/32392 ; dated Aug. 7, 2018; 10 pages.

Thomas, Shane; International Search Report; PCT/US17/22795; dated Jun. 9, 2017; 15 pages.

Copenheaver, Blaine R.; International Search Report; PCT/US2017/037242; dated Aug. 7, 2017; 13 pages.

Tassinari, Francesca, Supplementary European Search Report, EP 14832703, dated Feb. 27, 2017, 8 pages.

Young, Lee W, International Search Report, PCT/US 14/49468, dated Oct. 22, 2014, 9 pages.

* cited by examiner

COLLOIDAL AGENTS FOR AQUIFER AND METALS REMEDIATION

CROSS-REFERENCE TO RELATED APPLICATIONS

The present application is a continuation-in-part of U.S. patent application Ser. No. 14/449,404, filed Aug. 1, 2014 entitled COLLOIDAL AGENTS FOR AQUIFER REMEDIATION, which claims priority to U.S. Provisional Patent Application Ser. No. 61/861,854, filed Aug. 2, 2013, entitled COLLOIDAL AGENTS FOR AQUIFER REMEDIATION, the present application further claims priority to U.S. Provisional Patent Application Ser. No. 62/309,193, filed Mar. 16, 2016 entitled AGENTS FOR METALS REMEDIATION, all of the teachings of which are incorporated herein by reference.

STATEMENT RE: FEDERALLY SPONSORED RESEARCH/DEVELOPMENT

Not Applicable

BACKGROUND

The present invention is directed to stabilized compositions of particulate materials and the use of such compositions to remediate contaminants from soil and groundwater.

There are many useful remediation agents for removing organic and inorganic contaminants from groundwater. Such agents can operate in a variety of modes including through sorption, direct destruction, stimulation of biodegradation and/or through stabilization of the contaminants. Through these various modes of action, the remedial agents act to detoxify the water and reduce any health risks associated with the contaminant.

While some remedial agents are completely soluble in water and allow for their relatively straightforward application in both in place (in situ) and out of place (ex situ) systems, many useful remedial agents are not soluble in water. In these cases, the application of the insoluble remedial agents is often limited to above ground treatment systems (e.g., pump and treat systems) or in trench barriers (e.g., permeable reactive barriers). However, it is desirable to use these solid remediation agents in situ and apply them via various injection or percolation techniques in order to increase the range of sites that can be treated and to reduce project costs.

The limitation with solid remedial agents is that they are commonly manufactured in granular or powdered forms and therefore lack mobility in the subsurface which limits their contact with contaminants and the efficacy of treatment. The lack of mobility requires installation techniques that are more expensive, more disruptive to the subsurface, and often render less control of emplacement; an example of this is high pressure injections (e.g., hydraulic fracturing or fracking). Even if the solids are manufactured in a smaller particle size, they tend to agglomerate and then still require similar disruptive injection techniques.

For example, the use of metal sorbents, particularly materials that are derived from or contain apatite-type phosphate minerals, is an established method for remediating water and soil contaminated with metals or radionuclides. Several of these materials may include hydroxyapatite, bone char, and apatite II, among others. The apatite-containing materials can capture or chemically immobilize metals and radionuclides as insoluble forms with extremely low solubility constants to reduce their bioavailability and decrease human and ecological risks by removing them from the dissolved phase and preventing their migration.

Typically, these materials are used in granular or powdered form within above ground treatment systems or they can be emplaced in situ via various physical methods e.g. soil mixing, back-filling of excavations, fracking, or installing in trenches known as permeable reactive barriers. These relatively disruptive application methods are required for apatite-based materials in powder or granular form because they do not readily distribute through soil to reach areas of contaminated water. This lack of mobility causes the cost of treatment to be very high, whereas the contact with contaminated water remains quite low. The high cost is primarily due to the installation requirements to thoroughly treat a contaminated area.

Exemplary prior art teachings of metal sorbents for use in metals remediation include the following references:

Tofe, U.S. Pat. No. 5,711,015, Filed 1996. Discloses the use of pulverized or particulate animal bone or synthetic bone as a source of hydroxyapatite to decontaminate various metals (transuranic, Pu, radioactive). Discloses the use of <0.1 mm to 10 mm sized particulates. Discloses the method of passing metal contaminated water through a container that holds the hydroxyapatite-based particulates.

Conca & Wright, U.S. Pat. No. 6,217,775 B1, Filed 1998. Discloses the use of fish bones and fish hard parts with associated organics in order to treat soil leachates or waste sites contaminated with various metals (lanthanides, actinides, Pb, Zn, Cu, Cd, Ni, U, Ba, Cs, Sr, Pu, Th). Discloses methods for using the material that includes backfilling an excavation, horizontal drilling, Moore, U.S. Pat. No. 6,416,252 B1: Discloses a method for in situ formation of apatite barriers by injecting precursor reagents, ex. sodium phosphate and calcium chloride, into the subsurface. Also discloses optimal pH ranges of 7 to 8 and optimal temperatures of 40° C. to 100° C. for this process.

In another example, activated carbon is commonly used as a sorbent medium for removing organic and inorganic contaminants from water. It is used in treatment systems to detoxify industrial process water, as well as in pump-and-treat systems for above-ground treatment of contaminated groundwater. In use, activated carbon is typically manufactured and used in granular or powder form whereby the particulate is loaded into fluid- or fixed-bed treatment systems or dispersed or distributed over the area subject to contamination.

The in situ application of activated carbon to soil and groundwater allows for the capture or immobilization of contaminants from groundwater via sorption onto the carbon. This inhibits the migration of a contaminant plume and lowers the risk of damage to human health or ecological systems. Exemplary prior art teachings of carbon-based compositions for use in environmental remediation include the following references:

U.S. Pat. No. 4,664,809, issued May 12, 1987, to Fenton, entitled GROUNDWATER POLLUTION ABATEMENT, discloses drilling of wells in the ground and injecting a sorbent for contaminants into the path of groundwater plume, in order to stop the plume. Such reference further discloses the use of activated carbon as a sorbent and the addition of stabilizing substances to sorbent slurries.

In the name of Kopinke, F.-D.; Woszidlo, S.; Georgi, A., European Patent Application EP 1462187 A2, filed Mar. 2, 2004, "Verfahren zur in-situ Dekontamination schadstoffbelasteter Aquifere," discloses a process for in-situ decontamination of polluted aquifers—by injection of colloidal carbon. Such reference discloses that a charcoal particle size <10 microns is optimal and that ionic strength inhibits colloid transport. The objective of the invention is to increase distribution of carbon colloids in subsurface by flushing with deionized water or raising pH of aquifer.

Georgi, A.; Schierz, A.; Mackenzie, K.; Kopinke, F.-D., Terra Tech, 2007, 16, (11-12), 2-4. "Mobile Kolloide. Anwendung von kolloidaler, Aktivkohle zur In-Situ-Grundwasserreinigun, (in German) also refers to aquifer treatment with colloidal activated carbon and that a 0.1 to 10 micron activated carbon particle size is needed for stability and mobility. The optimal particle size is disclosed as 0.5 to 2 microns. Moreover, such reference teaches that humic acid and carboxymethylcellulose (CMC) are stabilizers of activated carbon colloids and can have a max loading of <10% on carbon.

Mackenzie, K., et al.; *Water Research* 2012, entitled "Carbo-iron—An Fe/AC composite—As alternative to nano-iron groundwater treatment" and supporting information is a paper teaching the use of "carbo-iron" an activated carbon material that has embedded iron metal particles for contaminant treatment. The carbo-iron is comprised mostly of activated carbon and behaves similarly to activated carbon as a colloidal material. Such reference discloses that max loading of CMC onto carbo-iron is 7% w/w and that no further stabilization benefit occurs above 5% w/w loading of CMC.

The prior art Georgi (2007) and Mackenzie (2012) references referred to above disclose that sodium carboxymethyl cellulose (a polyanionic polymer) stabilizes colloidal activated carbon against settling. It also has some effect to increase transport of activated carbon through soil and groundwater in situ. As the carbon contacts the contaminated groundwater, contaminants are sorbed out of solution and onto the carbon particles. Carboxymethyl cellulose-stabilized colloidal carbon can also transport somewhat in the aquifer, but is destabilized and deposited by ionic strength of the water (Kopinke 2004).

There are additional examples that describe the use of carboxymethyl cellulose to stabilize and enhance the transport of mobility limited nano- or colloidal-sized remediation agents. An example of this is with zero valent iron (ZVI) that is described in U.S. Pat. No. 7,635,236 issued to Zhao and Xu on Dec. 22, 2009, entitled "In situ remediation of inorganic contaminants using stabilized zero-valent iron nanoparticles." This patent discloses the use of CMC to control the dispersivity of ZVI to remediate inorganic toxins.

The mobility limitations described for activated carbon, apatite-containing materials, and ZVI above are inherent to insoluble remediation agents. And while the use of CMC has been established to enhance these types of materials, there is still a desire to enhance the transportation of the materials in situ where they will interact with the natural ionic strength of groundwater.

The teachings of all the aforementioned references are incorporated herein by reference. Notwithstanding their respective teachings, however, there are significant limitations regarding the use and efficacy of in situ treatments. In particular, as a powder or granular material, remediation materials, such as activated carbon, cannot distribute through soil to reach areas of contaminated water. Instead, it must be applied in a trench to treat water passing therethrough, or must be injected as a slurry which has limited or no mobility in the aquifer. This lack of mobility causes the cost of treatment to be very high, whereas the contact with contaminated water remains quite low. The high cost is primarily due to the large number of application points required to thoroughly treat a contaminated area.

To facilitate treatment of contaminated groundwater, it is desirable that the remediating agents be able to transport effectively through an aquifer to reach contaminated zones while remaining highly active toward contaminants. To facilitate treatment of contaminated groundwater, it is desirable to have a form of solid remedial materials that can be emplaced in situ with minimal disturbance to the native aquifer conditions and that can transport effectively through an aquifer to reach contaminated zones while retaining its treatment efficacy. Additionally, the remediating agent should be effective across a wide range of aquifer conditions, including pH and redox.

It is therefore desirable to have improved methods and compositions that will distribute colloidal remediation agents, including those treating organic and inorganic contaminants (e.g., chlorinated solvents, pesticides, energetics, hydrocarbons, metal contaminants, etc.), much farther in the subsurface than simple carboxymethyl cellulose. It is likewise desirable to provide such a composition that is of simple formulation, easy to deploy, is substantially effective at remediating contaminants from soil and groundwater, and is further substantially more effective in becoming dispersed and capable of being quickly and effectively deployed over a greater area of volume of soil and groundwater than prior art compositions and methods of using the same for environmental remediation.

BRIEF SUMMARY

The present invention specifically addresses and alleviates the above-identified deficiencies in the art. In this regard, the present invention is directed to compositions of particulate remediation agent materials operative to form colloids and the use of such compositions in environmental remediation, and in particular as a means of remediating organic and/or inorganic contaminants in soil and groundwater. According to a preferred embodiment, the invention comprises the combination of one or more particulate remediation agents, preferably formed to have a very fine particulate size, typically ranges from 0.1 to 10 microns, and preferably 0.5 to 2 microns, that is stabilized by at least two additives. The first additive is a stabilizing polymer, which may comprise either an anionic or nonionic polymer. The second additive is a distribution enhancement agent operative to facilitate the ability of the composition to become distributed and dispersed about a matrix of soil and groundwater. Preferably, the distribution enhancement agent will include one or more agents selected from the group consisting of chelating agents, anionic polymers, anionic surfactants or nonionic surfactants.

According to a preferred embodiment, the ratio of particulate remediation agent: first additive: second additive present in amounts relative one another are in the range of 1 (remediation agent):0.01-1.0 (first additive):0.01-1.0 (second additive). In a more highly refined embodiment, the ratio of the aforementioned components of remediation agent: first additive:second additive are in the range of 1 (remediation agent):0.05-0.5 (first additive):0.025-0.5 (second additive), based upon relative weights of such components.

With respect to the particulate remediation agent, such material may comprise activated carbon, animal bone, fish bone, synthetic bone, hydroxylapatite, fluorapatite, chlorapatite, apatite II, bone char, bone charcoal, bone ash, bone black, steel slag, furnace slag, metal oxides, including but not limited to iron oxide, iron oxyhydroxide, and iron hydroxide, alumina, zeolites, coffee beans, polylactic acids, chitin, zero-valent iron, silica, and metal silicates, namely calcium silicate, magnesium silicate and iron silicate. Combinations of the different types of particulate remediation agents are also contemplated.

In use, the compositions of the present invention are operative to form water-based colloids of the remediation agent, and can be deployed as an aqueous admixture whereby the remediation agent component of the aqueous admixture will range between 0.01% and 70.0% by weight of the water. In a more highly-refined method, the water based colloids of the present invention can be injected, such as by high pressure injection or fracturing, in the range of 0.02% to 40.0% particulate remediation agent. In addition to injection, the water-based colloids formed according to the present invention can be applied by gravity feed or percolation into soil. As for general application rates, the compositions of the present invention can be applied at a rate between approximately 1 and 80 gallons of aqueous admixture per cubic yard of soil and groundwater, and preferably between approximately 4 and 60 gallons per cubic yard.

DETAILED DESCRIPTION

The detailed description set forth below is intended as a description of the presently preferred embodiment of the invention, and is not intended to represent the only form in which the present invention may be implemented or performed. The description sets forth the functions and sequences of steps for practicing the invention. It is to be understood, however, that the same or equivalent functions and sequences may be accomplished by different embodiments and that they are also intended to be encompassed within the scope of the invention.

New compositions and methods have been developed that enable increased distribution of colloids of remediation agents through soil and groundwater. This allows for very cost-effective treatment of contaminated aquifers, and therefore control over mobility of contaminants in groundwater and soil systems.

The compositions of the present invention include a very fine remediation agent material, (0.1 to 10 micron size, and preferably within a 0.5 to 2 micron range). The remediation agent materials are operative to sequester, stabilize, directly react with, and/or promote the biodegradation of, and hence prevent further transport of the target contaminant. The remediation agent material will comprise activated carbons, an apatite-containing material, which can include, but is not limited to animal bone, fish bone, synthetic bone, hydroxylapatite, fluorapatite, chlorapatite, apatite II, bone char, bone charcoal, bone ash, and bone black, steel slag, furnace slag, metal oxides, including but not limited to iron oxide, iron oxyhydroxide, and iron hydroxide, alumina, zeolites, coffee beans, polylactic acids, chitin, zero-valent iron, silica, and metal silicates, namely calcium silicate, magnesium silicate and iron silicate, as well as combinations. To the extent that a particulate very fine remediation agent materials is granulated from a bulk material (i.e. coffee beans), it is understood that there are many well-characterized methods known to one of ordinary skill in the art operative for granulating a very fine remediation agent material (i.e. granulated coffee bean particles) from a less granular or bulk material, and it may be seen that any of these well-known methods, which may include, without limitation, crushing, grinding, milling, macerating, triturating, pulverizing, etc., utilizing any apparatus which may be operative to perform such a function, may be utilized in order to produce a suitable very fine remediation agent material.

The compositions of the present invention further comprise at least two additives, wherein the first additive is a stabilizing polymer, and the second additive is a distribution enhancement agent. The addition of one or more distribution enhancement agents enables the colloidal material to distribute significantly further through soil and groundwater during application than the compositions and methods of the prior art.

The first additive, or stabilizing polymer, can be an anionic polymer or a nonionic polymer. Examples include but are not limited to carboxymethyl cellulose (CMC), carrageenan, polyacrylic acid, xanthan gum (nonionic), and combinations thereof.

The second additive, or distribution enhancement agent, is selected from the following list: chelating agents, anionic polymers, anionic surfactants, or nonionic surfactants, and possible combinations thereof.

Chelating agents include but are not limited to citrates, phosphates (e.g. SHMP, STTP, TSPP), silicates, borates, sulfates, carbonates, aminocarboxylic acids and salts thereof (e.g. EDTA, MGDA and NTA), polyamines such as ethylene diamine, as well as combinations thereof.

Anionic polymers of the second additive include but are not limited to sulfated or carboxylated polysaccharides, polyacrylates, polyacrylamides, lignosulfonate, polyacrylate copolymers, and combinations thereof.

Anionic surfactants include but are not limited to dioctyl sodium sulfosuccinate, alkyl and aryl sulfates (e.g. sodium lauryl sulfate), alkyl carboxylates (e.g. sodium laurate) and combinations thereof.

Nonionic surfactants include but are not limited to alkyl polyethylene oxides, ethylene oxide polymers, polyethylene oxide lauryl ether (e.g., Brij 30® produced by Croda, Inc.), ethylene oxide-propylene oxide copolymers (e.g., Tergitol XD® produced by the Dow Chemical Company), and combinations thereof.

Compositions of this invention are preferably formed wherein the relative weight ratios of remediation agent: first additive (stabilizing polymer):second additive (distribution enhancing agent) are in the range of: 1:0.01-1.0:0.01-1.0 and preferably in the ranges of 1:0.05-0.5:0.025-0.5

The methods of groundwater treatment using the compositions of the present invention include applying a slurry of the aforementioned compositions to the area of contaminated groundwater sought to be treated. To that end, the slurry will be introduced via a technique well-known to those skilled in the art, such as injection or other application of the above compositions as a water-based colloid such that the remediation agent concentration is between 0.01% and 70.0% by weight in water. Preferably, the material can be injected in the range of 0.02% to 40.0% remediation agent material by weight in water. In addition to injection, such as high pressure injection and fracturing, the aqueous admixture containing the compositions of the present invention can be applied by gravity feed or percolation in the amount sufficient to remediate the contaminants believed to be present in a given area of contaminated soil/groundwater. Along those lines, depending on the site geology and degree of contamination, a general application rate can range from between approximately 1 to 80 gallons of the aqueous admixture of the water-based colloid of the present invention per cubic yard of soil and groundwater to be treated, and preferably between approximately 4 and 60 gallons of the aqueous admixture per cubic yard treated.

The slurry may also be co-applied or successively applied with additional amendments that are selected from a group comprised of substances that release hydrogen or oxygen, substances that through biological reactions produce hydrogen or oxygen, an electron donor, an electron acceptor, a nutrient, a microorganism, a chemical oxidant, a chemical reductant, cysteine, cysteinate compounds, a buffer and combinations thereof such that the additional amendment acts in concert with the remediation agent to enhance treatment of the contaminants present in the soil and groundwater.

By way of illustration, and by no means as limiting the present invention, the following examples are provided:

Example 1

Dispersion Preparation:

A series of colloidal dispersions were prepared with the following general composition: 1% w/w activated carbon as the remediation agent (approximately 1.5 micron average particle size), 0.25% w/w stabilizing polymer, and 0.25% w/w distribution enhancement agent. The dispersions were prepared as follows: The stabilizing polymer and second additive were mixed thoroughly into water with a high-shear mixer and mixed until homogeneous. A slurry of activated carbon in water was then added to the mixture. Each dispersion was mixed for an additional 5 minutes resulting in a very homogeneous, black colloidal suspension. The compositions of the tested dispersions and some comparative samples are shown in Table 1.

Example 2

Column Transport Testing:

Each of the colloids in Example 1 was diluted with tap water to a carbon concentration of 2,000 mg/L. A 25 g aliquot of each diluted colloid was eluted through a glass column (bed dimensions 2.5×24.0 cm) packed with saturated soil having a sand/silt/clay ratio of 93.7/3.9/2.4. The 25 g sample was eluted through the column and flushed with additional tap water until the column effluent was clear. Activated carbon in the combined effluent from each column study was measured by UV-visible spectroscopy. The total mass of carbon eluted was calculated using a calibration curve. For comparison to the prior art, a standard colloid sample stabilized only by CMC was studied (Sample #1). The mass of carbon eluted by each sample is reported in table 1, and the amount of carbon eluted is also reported as a percentage relative to the standard.

The data in Table 1 show that the present invention results in significant increases of activated carbon colloid transport through soil and groundwater. It is also apparent from these data that the use of the stabilizing polymer or distribution enhancement agents alone results in very poor performance, and therefore their combination is required. This invention provides a significant improvement in efficiency and reduction in cost for treatment of contaminated aquifers.

TABLE 1

Composition and Column Study Data

| Sample Number | Stabilizing Polymer | Distribution Enhancer | mg Carbon Eluted | Carbon Eluted vs Standard |
| --- | --- | --- | --- | --- |
| 1 | CMC (standard) | None | 5.4 | 100% |
| 2 | CMC | MGDA | 17.3 | 320% |
| 3 | CMC | ethylene oxide/propylene oxide copolymer (Tergitol XD ®) | 21.1 | 391% |
| 4 | CMC | EDTA | 14.1 | 261% |
| 5 | CMC | Sodium citrate | 18.2 | 337% |
| 6 | CMC | NTA | 20.5 | 380% |
| 7 | CMC | SHMP | 14.7 | 272% |
| 8 | CMC | STPP | 20.0 | 370% |
| 9 | CMC | Lignosulfonate | 21.1 | 391% |
| 10 | CMC | polyethylene oxide lauryl ether (Brij 30 ®) | 20.2 | 374% |
| 11 | CMC | SLS | 22.4 | 415% |
| 12 | CMC | Sodium laurate | 24.5 | 454% |
| 13 | CMC | DSS | 15.7 | 291% |
| 14 | CMC | TSPP | 16.0 | 296% |
| 15 | CMC | SDBS | 22.8 | 422% |
| 16 | Carrageenan | None | 5.1 | 94% |
| 17 | Carrageenan | SHMP | 11.5 | 213% |
| 18 | Xanthan Gum* | None | 7.5 | 139% |
| 19 | Xanthan Gum* | STPP | 16.1 | 298% |
| 20 | None | MGDA | 0 | 0% |
| 21 | None | polyethylene oxide lauryl ether (Brij 30 ®) | 0 | 0% |
| 22 | None | ethylene oxide/propylene oxide copolymer (Tergitl XD ®) | 0 | 0% |
| 23 | None | None | 0 | 0% |

Xanthan gum experiments were run on shorter columns and therefore not directly comparable Abbreviations as Utilized and Referenced in the Specification:
CMC carboxymethyl cellulose, sodium salt
DSS dioctyl sodium sulfosuccinate
EDTA ethylenediaminetetraacetic acid, sodium salt
MGDA methylglycine diacetic acid, sodium salt
NTA nitrilotriacetic acid, sodium salt
SDBS sodium dodecylbenzenesulfonate
SHMP sodium hexametaphosphate
SLS sodium lauryl sulfate
STPP sodium tripolyphosphate
TSPP tetrasodium pyrophosphate Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A composition for use in aquifer remediation, said composition consisting essentially of:
    at least one particulate remediation agent selected from the group consisting of animal bone, fish bone, synthetic bone, hydroxylapatite, fluorapatite, chlorapatite, apatite II, bone char, bone charcoal, bone ash, bone black, steel slag, furnace slag, iron oxide, iron oxyhydroxide, iron hydroxide, alumina, zeolites, coffee beans, polylactic acids, chitin, silica, calcium silicate, magnesium silicate, iron silicate and combinations thereof;
    a stabilizing polymer;
    a distribution enhancement agent including a chelating agent selected from the group consisting of citrates, phosphates, silicates, borates, sulfates, carbonates, aminocarboxylic acids and salts thereof, polyamines and combinations thereof; and
    wherein said particulate remediation agent: stabilizing polymer: distribution enhancement agent are present in amounts relative one another by weight in a ratio in a range of 1:0.01-1.0:0.01-1.0.

2. The composition of claim 1 wherein said relative amounts of particulate remediation agent: stabilizing polymer:distribution enhancement agent are present in a ratio in a range of 1:0.05-0.5:0.025-0.5.

3. The composition of claim 1 wherein said stabilizing polymer is selected from the group consisting of an anionic polymer and a nonionic polymer.

4. The composition of claim 3 wherein said stabilizing polymer is selected from the group consisting of carboxymethyl cellulose, carrageenan, polyacrylate, xanthan gum, and combinations thereof.

5. A composition for use in aquifer remediation, said composition consisting essentially of:
    at least one particulate remediation agent selected from the group consisting of animal bone, fish bone, synthetic bone, hydroxylapatite, fluorapatite, chlorapatite, apatite II, bone char, bone charcoal, bone ash, bone black, steel slag, furnace slag, iron oxide, iron oxyhydroxide, iron hydroxide, alumina, zeolites, coffee beans, polylactic acids, chitin, silica, calcium silicate, magnesium silicate, iron silicate and combinations thereof;
    a stabilizing polymer;
    a distribution enhancement agent including an anionic surfactant selected from the group consisting of alkyl, aryl, and ethoxylated sulfates, alkyl and aryl sulfonates, alkyl carboxylates, and combinations thereof; and
    wherein said particulate remediation agent: stabilizing polymer:distribution enhancement agent are present in amounts relative one another by weight in a ratio in a range of 1:0.01-1.0:0.01-1.0.

6. A composition for use in aquifer remediation, said composition consisting essentially of:
    at least one particulate remediation agent, the at least one particulate remediation agent including coffee particles having a particle size ranging from 0.1 to 10 microns;
    a stabilizing polymer;
    a distribution enhancement agent; and
    wherein said particulate remediation agent: stabilizing polymer:distribution enhancement agent are present in amounts relative one another by weight in a ratio in a range of 1:0.01-1.0:0.01-1.0.

7. An aqueous admixture for removing contaminants from an aquifer consisting essentially of:
    at least one particulate remediation agent, said at least one remediation agent being selected from the group consisting of activated carbon, animal bone, fish bone, synthetic bone, hydroxylapatite, fluorapatite, chlorapatite, apatite II, bone char, bone charcoal, bone ash, bone black, steel slag, furnace slag, iron oxide, iron oxyhydroxide, iron hydroxide, alumina, zeolites, coffee beans, polylactic acids, chitin, zero-valent iron, silica, calcium silicate, magnesium silicate, iron silicate and combinations thereof;
    a stabilizing polymer;
    a distribution enhancement agent; and
    wherein said particulate remediation agent: stabilizing polymer:distribution enhancement agent are present in amounts relative one another by weight in a ratio in a range of 1:0.01-1.0:0.01-1.0;
    water; and
    wherein said water, particulate remediation agent, stabilizing polymer and distribution enhancement agent are operative to form a colloid wherein said particulate remediation agent is present in an amount ranging from 0.01% to 70.0% by weight in said water.

8. The composition of claim 7 wherein said particulate remediation agent material is present in an amount ranging from 0.02% to 40.0% by weight in said water.

9. The aqueous admixture of claim 7 wherein said particulate remediation agent has a particle size ranging from 0.1 to 10 microns.

10. The composition of claim 7 wherein said particulate remediation agent is selected from the group consisting of animal bone, fish bone, synthetic bone, hydroxylapatite, fluorapatite, chlorapatite, apatite II, bone char, bone charcoal, bone ash, bone black, steel slag, furnace slag, iron oxide, iron oxyhydroxide, iron hydroxide, alumina, zeolites, coffee beans, polylactic acids, chitin, zero-valent iron, silica, calcium silicate, magnesium silicate and iron silicate.

11. A method of capturing or immobilizing contaminants from soil and groundwater comprising the steps:
    a) forming an aqueous admixture, said aqueous admixture consisting essentially of:
        at least one particulate remediation agent;
        a stabilizing polymer;
        a distribution enhancement agent; and
        wherein said ratio of said particulate remediation agent material: stabilizing polymer:distribution enhancement agent are present in amounts relative one another by weight in a range of 1:0.01-1.0:0.01-1.0; and
        water;
        wherein said particulate remediation agent material is present in an amount ranging from 0.01% to 70% by weight in said water; and
    b) applying said aqueous admixture formed in step a) to said soil and groundwater such that said admixture becomes distributed and dispersed within said soil and groundwater.

12. The method of claim 11 wherein in step b), said aqueous admixture is applied by injection into said soil and groundwater.

13. The method of claim 12 wherein said injection comprises high pressure injection or fracturing.

14. The method of claim 12 wherein step b) said aqueous admixture is applied by gravity feed to said soil and groundwater.

15. The method of claim 11 wherein step b) said aqueous admixture is applied by percolation.

16. The method of claim 11 wherein in step a), said particulate remediation agent has a particle size ranging from 0.1 to 10 microns.

17. The method of claim 11 wherein the particulate remediation agent is selected from the group consisting of activated carbon, animal bone, fish bone, synthetic bone, hydroxylapatite, fluorapatite, chlorapatite, apatite II, bone char, bone charcoal, bone ash, bone black, steel slag, furnace slag, iron oxide, iron oxyhydroxide, iron hydroxide, alumina, zeolites, coffee beans, polylactic acids, chitin, zero-valent iron, silica, calcium silicate, magnesium silicate, iron silicate and combinations thereof.

\* \* \* \* \*